United States Patent [19]

Babbin

[11] 4,131,409
[45] Dec. 26, 1978

[54] APPARATUS FOR VULCANIZING HOSE

[75] Inventor: William R. Babbin, Barberton, Ohio

[73] Assignee: The B. F. Goodrich Company, Akron, Ohio

[21] Appl. No.: 827,515

[22] Filed: Aug. 25, 1977

[51] Int. Cl.$^2$ .................. B29C 25/00; B29H 7/14
[52] U.S. Cl. ................................ 425/445; 425/392
[58] Field of Search ................. 425/392, 445; 264/347

[56] References Cited

U.S. PATENT DOCUMENTS

| | | | |
|---|---|---|---|
| 1,210,938 | 1/1917 | Hewitt | 425/392 |
| 2,483,709 | 10/1949 | Paulsen | 425/445 |
| 3,901,633 | 8/1975 | Chrisman et al. | 425/445 X |
| 3,966,387 | 6/1976 | Babbin et al. | 425/445 |
| 4,029,450 | 6/1977 | Caser | 425/445 X |

Primary Examiner—Robert L. Spicer, Jr.
Attorney, Agent, or Firm—Joseph Januszkiewicz

[57] ABSTRACT

An apparatus for continuously vulcanizing elastomeric hose employing a tubular, helically extending vulcanizing chamber with an entrance for unvulcanized hose at one end and an exit for vulcanized hose at the other end terminating in a fluid bath which collects the vulcanizing fluid for re-circulation. Means are provided to circulate a vulcanizing fluid at elevated temperatures and pressures through the chamber to transport the hose therethrough while providing the heat and pressure required for satisfactory vulcanization. The fluid bath provides means for effectively preventing escape of pressurized fluid contained in the system.

7 Claims, 6 Drawing Figures

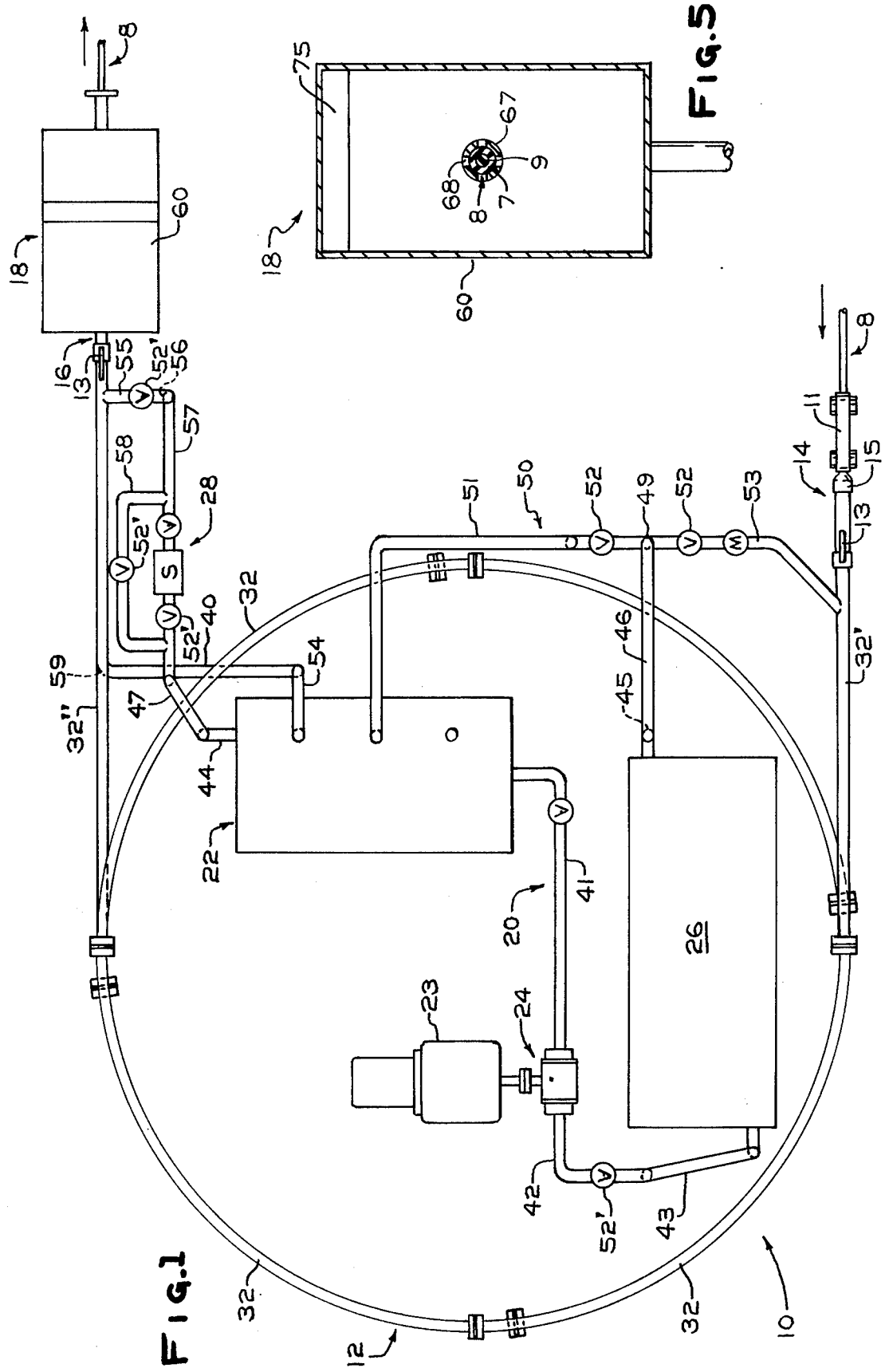

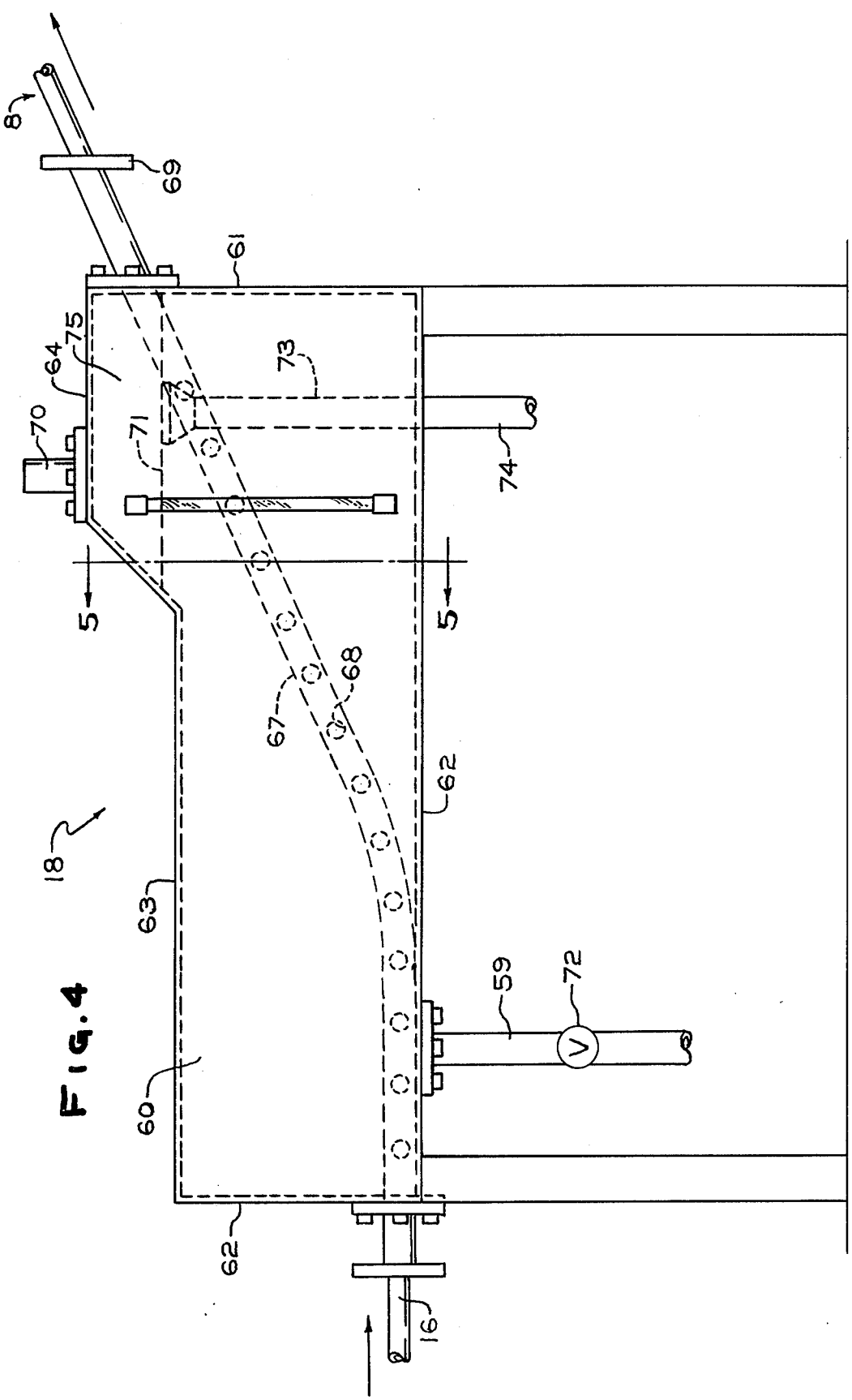

APPARATUS FOR VULCANIZING HOSE

BACKGROUND OF THE INVENTION

The invention relates to the vulcanization of rubber hose utilizing a vulcanizing fluid to transport and vulcanize a hose with means for recirculating the vulcanizing fluid.

Present techniques for the manufacture of rubber hose includes forming an unvulcanized elastomeric hose structure around a flexible, solid rubber mandrel, encasing the hose and mandrel within a pressure sheath or suitable cover and thence vulcanize the hose. The sheath is considered necessary to maintain pressure against the hose's outer surface preventing any defects which might otherwise develop during vulcanization. For vulcanization, the supported lengths of sheathed, mandreled, unvulcanized hose are then placed in heated enclosures, such as ovens, where they remain until cured. After removal from the oven, the outer sheath is stripped and the internal mandrel removed from the vulcanized hose.

Modifications on this technique include improved hose vulcanization by obviating need for the normally necessary outer pressure sheath and/or effecting vulcanization or cure of hose in a more continuous manner. One improvement in the continuous method passed the sheathed hose into a vulcanizing chamber, around a moving spool and withdrawal from the chamber thereafter. Another technique passed the hose through a tubular chamber by means of hot vulcanizing fluid such as oil.

Principal advantages allegedly achieved by transport of hose through a tubular chamber by hot fluid are that the use of an outer pressure sheath over the hose during cure is unnecessary, and reduces the area necessary to manufacture the hose. However, the tubular chamber with the hot vulcanizing fluids does have its drawbacks in requiring higher pressures on the fluids while transporting the hose. In addition, pressurization of the curing and transporting fluid is essential to maintain the inner diameter of the hose.

Additional problems of safety has limited its widespread use since the fluids are hot and turbulence and splashing within the fluid recovery system entrains air and accelerates oxidation degradation of the hot vulcanizing fluids. Special seals have helped in reducing the splashing of the hot fluids.

SUMMARY

This invention provides an improved apparatus for continuously vulcanizing elastomeric hose in a helical chamber wherein hot vulcanizing fluids move the hose through the vulcanizing chamber into a novel receiving tank which receives the finished hose and separates the hose from the hot vulcanizing fluid without creating a turbulence at the exit end thereof. The receiving tank eliminates the need for seals thereby simplifying the movement of the hose from the vulcanizing apparatus.

The vulcanizing chamber is formed of a series of arcuate sections of tubular pipe interconnected so as to extend in a helical path about a vertical axis with the receiving bath having a perforated guide sleeve therein substantially immersed in fluid to maintain a pressure head on the hot vulcanizing fluids which are recirculated.

THE DRAWINGS

FIG. 1 is a plan view of the hose vulcanizing apparatus illustrating an arrangement of its parts, some of the parts being represented schematically;

FIG. 4 is an enlarged side elevational view of a receiving tank shown in FIGS. 1 and 2.

FIG. 5 is a cross-sectional view of the receiving tank taken along line 5—5 of FIG. 4.

DETAILED DESCRIPTION

Figure 2:
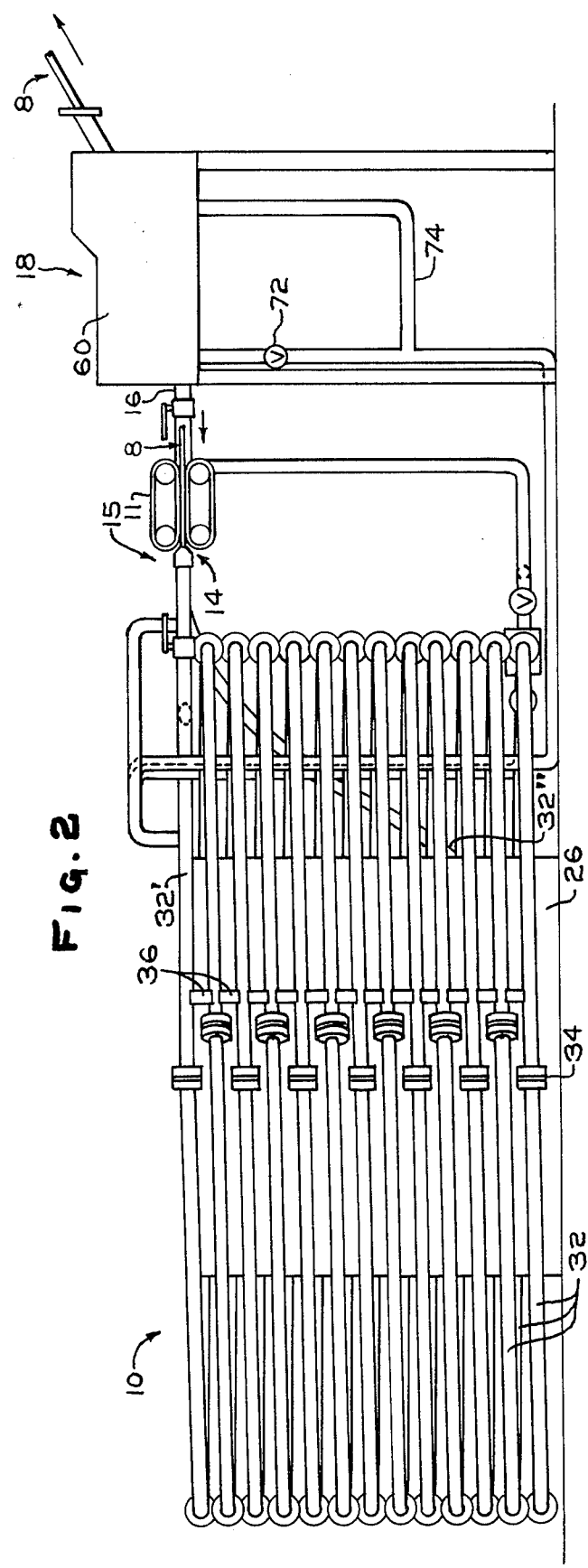
FIG. 2 is a side elevational view of the apparatus shown in FIG. 1.

Referring to the drawings, wherein like reference numerals designate like or corresponding parts throughout the several views, there is shown in FIGS. 1 and 2 an apparatus 10 for continuously curing an elastomeric hose assembly 8 shown entering the apparatus 10. The hose assembly 8 passing through apparatus 10, comprises an elastomeric hose structure 7 and in internal, removable, flexible, support mandrel 9. The mandrel 9 may be of solid rubber or plastic (e.g. nylon) (See FIG. 3.)

Figure 6:
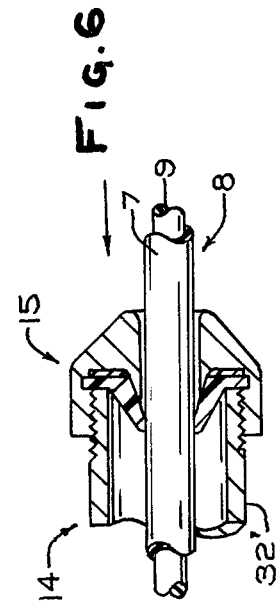
FIG. 6 is an enlarged longitudinal section view showing a sealing means for use with the hose vulcanizing apparatus.

The hose curing apparatus 10 according to a presently preferred embodiment of this invention comprises, generally, a helically extending vulcanizing chamber 12 having an entrance end 14 and an exit end 16. Adjacent the exit end 16 is a receiving tank 18. At the entrance end 14 is a special sealing device 15 shown in FIG. 6 positioned to receive the hose assembly 8 being driven or fed to chamber 12 by appropriate means such as a pair of endless driving belts 11. The belts 11 are powered by suitable means such as a motor (not shown) suitably mounted along with the belts 11 on an appropriate frame (not shown). The receiving tank 18 receives the hose assembly 8 from the hose curing apparatus 10 and suitably seals the fluid in the chamber 10 in a manner to be described hereinafter.

A closed fluid circulation system, indicated generally by numeral 20, forms part of the curing apparatus 10 and includes, generally, reservoir 22, pump 24, heating means 26 and fluid recovery means 28.

These components of the fluid circulation system 20 can be conveniently located within the inner perimeter confines of helical chamber 12 for optimum space utilization.

The helical chamber 12 is preferably composed of a plurality of curved or arcuate sections 32 of tubular steel pipe interconnected so as to helically extend around a vertical axis. As shown in FIG. 1 and 2, each pipe section 32 is an arcuate section subtending an angle of substantially 90° and is connected, at its ends, to ends of similar pipe sections by appropriately spaced, fluid tight flange connections 34. Each full helical turn of chamber 12 consists essentially of four pipe sections 32 interconnected by flange connections 34. The number of arcuate sections 32, the speed of movement of the elastomeric hose assembly within the chamber 12 and the temperature of the vulcanizing fluid will determine the vulcanization time of the hose assembly.

As seen in FIGS. 1 and 2, the chamber 12 includes a substantially linear entrance pipe section 32' commencing from entrance end 14 and an upwardly curved exit pipe section 32" extending to and terminating in exit 16. These two pipe sections 32' and 32" are basically similar in construction to the curved or arcuate pipe sections 32, except for their distinctive contours. Both sections 32' and 32" are provided with a handled valve 13 serving to open and close flow through the sections, as desired.

Vertically adjacent turns of chamber 12 are separated by a series of vertically aligned spacer members 36 to prevent contact therebetween. The fluid tight connections 34 in the vertical direction are shown laterally offset with respect to its immediately adjacent connection to prevent interference with each other. The helical chamber 12 may be insulated (not shown) to prevent heat loss. This can be accomplished by wrapping each component pipe section with appropriate insulation and placing the entire chamber 12 within a suitable insulated housing.

The inner diameter of the interconnected pipe sections 32 are larger than the outer diameter of the hose assembly 8 to facilitate the movement therethrough. The pipe inner diameter should be at least 25% to 30% larger than the hose assembly outer diameter for desirable operating conditions.

Figure 3:
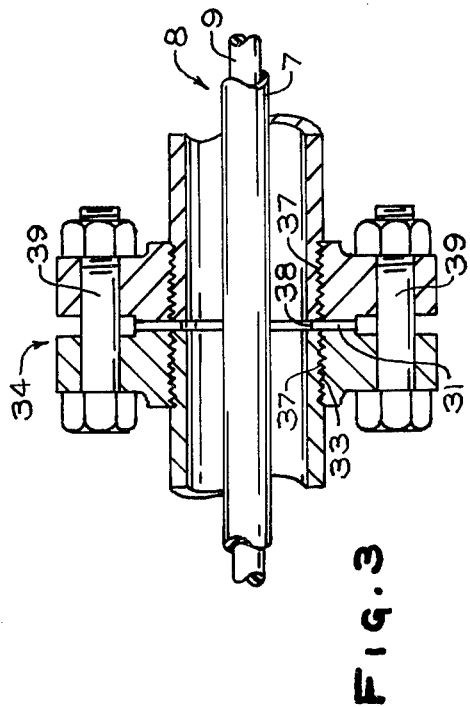
FIG. 3 is an enlarged longitudinal sectional view showing the interconnection of two portions of the vulcanizing chamber of the apparatus of FIGS. 1 and 2.

As seen in FIG. 3, each fluid tight connection 34 comprises a pair of annular disc-shaped flanges 33, each having a central threaded opening 35. The threaded opening 35 may have a constant diameter or slightly tapered. Openings 35 are suitably threaded as at 37 to threadably receive the ends of pipe sections 32. The extreme ends 38 of each pipe section should extend into their respective threaded openings 35 of flanges 33 so as to be as close as possible to each other when the flanges 33 are joined. The flanges 33 are secured to each other by suitable nut and bolt assemblies 39. A rubber sealing member 31 is disposed between the mating surfaces of pipe ends 38 and flanges 33.

The hose vulcanizing and transporting fluid to be used in the apparatus according to the present invention is preferably an oily liquid which has a boiling point substantially greater than the vulcanization temperature of the hose being vulcanized. Liquids for this purpose are suggested in the U.S. Pat. No. 3,475,397. Many common elastomeric hose structures are vulcanized at temperatures usually ranging from about 250° to 500° F. (110° C. to 249° C.). The vulcanizing and transporting fluid for use in the apparatus of this invention should preferably be miscible in water, so that washing of the hose after vulcanization can be a relatively simple operation.

The fluid circulating through chamber 12 to transport and cure the hose assembly 8 is to be introduced to the chamber at an elevated pressure to prevent defects in the hose during its vulcanization in chamber 12. The magnitude selected for this pressure is dependent upon various other factors such as total length, the inner diameter of chamber 12 and the diameter of the hose assembly. The hose vulcanizing and transporting fluid circulates through a closed system 20, which includes a storage tank or reservoir 22. Fluid is drawn or gravity fed from reservoir 22 through a conduit 41 to a gear-pump 24 driven by a motor 23.

The pump 24 pressurizes the fluid to a selected magnitude, for example, 90 to 100 psi, for transport therefrom through conduits 42 and 43 to a suitable heating means 26 well known in the art.

In the heating means 26, the vulcanizing fluid is raised to a preselected elevated temperature and, then passes vertically upwardly through conduit 45 to horizontal conduit 46. A feed conduit 50 below conduit 46 receives hot, pressurized fluid therefrom through intersection 49. A pair of flow control valves 52 are shown in feed conduit 50 on either side of intersection 49.

The feed conduit 50 consists of two branch conduits 51 and 53 branching in opposite directions from intersection 49. Fluid entering feed conduit 50 from horizontal conduit 46 can enter entrance pipe section 32' through feed branch conduit 53 and/or be returned to reservoir 22 through feed branch conduit 51. Thus, the velocity of fluid entering entrance pipe 32' from branch 53 is controllable through selective positioning of one, the other, or both of valves 52. A typical flow meter M is disposed downstream of valve 52 in branch conduit 53 to visually indicate the velocity of fluid entering entrance pipe section 32'. A plurality of valves 52' similar to valves 52 are located at various locations in the conduits throughout the system to make it possible to isolate various portions of the systems.

Thus, fluid at a preselected temperature and pressure enters chamber 12, at a velocity determined by its pressure and the settings of valves 52, at a portion of entrance pipe section 32' downstream of entrance end 14 and flows through the helical chamber 12. Hose assembly 8 entering chamber 12 at end 14 will be carried by this pressurized hot fluid through chamber 12 while receiving the requisite pressure and heat therefrom for satisfactory vulcanization.

Upon reaching the end of helical chamber 12, the hose and fluid enter the upwardly curved exit pipe 32" as seen in FIG. 2 and is directed from exit end 16 to the receiving tank 18. Upstream of exit end 16, a portion of the fluid may leave exit pipe 32" and enter fluid recovery means 28 through a fluid return line 55 branching off exit pipe section 32". Fluid moves from branch line 55, through vertical conduit 56 through conduit 57 and into and through a strainer S. A bypass conduit 58 is provided across strainer S in the event strainer S becomes clogged. After passing through strainer S, fluid then is returned to reservoir 22 through conduits 47 and 44.

The main flow of vulcanizing fluid will flow with the hose assembly via exit pipe 32" to the receiving tank 18.

Receiving tank 18 is a rigid generally rectangular shaped housing with a pair of side walls 60 with a portion of one end of wall 60 thereof adjacent to an end wall 61 extending upwardly in the form of a trapezoid. The other end wall 62 is smaller in height than end wall 61. The top wall has a planar portion 63 and a smaller flat planar portion 64 that extends over the trapezoidal portions of the side walls 60. The top wall has a slanted portion 65 bridging portions 63 and 64 to fully enclose the tank. A perforated guide tube 67, an extension of exit end 16, enters tank 18 at the lower end of end wall 62 and exits from the tank 18 at the upper end of end wall 61. Guide tube 67 has perforations or bores 68 along the entire length thereof to approximately the end wall 61 of tank 18 and thereafter continues as a rigid continuous closed tube and terminating as a flange 69. The perforations in the guide tube permits the hot vulcanizing fluids to flow out of the tube 67 and into the receiving tank 18 which is filled with oil to approximately the uppermost top wall 64. The level of fluid in the tank 18 provides a pressure head for the oil within the vulcanizing system. A vent pipe 70 is connected to the top planar portion 64 to remove any noxious vapors formed by the fluid degradation in the upper section of the tank 18 above fluid level 71 (which defines a chamber 75) in the uppermost portion of tank 18. A fluid return line 59 from tank 18 is connected to conduit 54 which in turn is connected to reservoir 22. A suitable cut-off valve 72 is mounted in conduit 59 to control the flow of fluid from the tank 18 in conjunction with an overflow pipe 73 which is connected by a branch conduit 74 to conduit 59 and reservoir 22. Such receiving tank 18 eliminates the need for complex sealing means at the exit end of the helical chamber 12. With valve 72 and overflow pipe 73 the level of fluid in tank 18 is maintained at fluid level 71 designed in FIG. 4.

The hose assembly 18 may be washed as by spraying after its passage through the receiving tank 18 in a manner well known in the art.

With the use of the entry of the heat transfer vulcanizing fluids and the elastomeric hose assembly into the receiving tank below the preset fluid level therein, the fluid velocity is reduced thereby eliminating splashing and minimizing fluid turbulence. Such action eliminates the entrainment of the air by the heat transfer fluids and retards to a great degree if not eliminating oxidation degradation to such fluids. The receiving tank design by reducing the surface area of the fluids exposed to the air further reduces the rate of oxidation degradation. In lieu of the air pocket contained in chamber 75, such chamber 75 may be an inert atmosphere such as nitrogen to retard oxidative degradation of the heat transfer fluid. In this instance, a pressure release cap would be placed on the vent pipe 70. In lieu of the vent pipe, a second tank filled with inert gases could encompass all or a portion of the tank 18 to retard the oxidative degradation of the heat transfer fluids. The receiving tank described eliminates fluid loss and essentially makes the fluid system a closed system which increases the efficiency of the vulcanization system and enhances operator safety from the hot fluids and noxious vapors emanating from the fluid decomposition products.

It is evident that many of the individual features of the apparatus described are capable of obvious modification and replacement by full equivalents without departure from the inventive concept to be measured by the following claims.

I claim:

1. Apparatus for vulcanizing elastomeric hose comprising, an elongated chamber, said chamber having an entrance end and an exit end, means for circulating fluid at selected elevated temperature and pressure through said chamber from adjacent said entrance end to said exit end, fluid recovery means mounted adjacent to said exit end of the said chamber, means for recycling fluid from said recovery means to said fluid circulating means, said entrance end of said chamber having sealing means for receiving and moving unvulcanized hose into said chamber through said entrance end for transport through said chamber by said circulating fluid, and said fluid recovery means having a fluid level higher than in said chamber and said entrance end to provide a head of pressure to said fluid, and said fluid recovery means having an overflow conduit located therein to regulate said level in said fluid recovery means and provide an air chamber therein.

2. An apparatus for vulcanizing elastomeric hose as set forth in claim 1 wherein said air chamber is closed and filled with an inert gas.

3. An apparatus for vulcanizing elastomeric hose as set forth in claim 2 wherein said inert gas is nitrogen.

4. An apparatus for vulcanizing hose comprising an elongated vulcanizing chamber, said chamber being of circular cross-section extending helically about a vertical axis, said chamber having an entrance end and an exit end, a receiving tank mounted at said exit end, said receiving tank having an air dome therein, said air dome being a small percentage of the volume of said receiving tank, said receiving tank having a guide sleeve extending from the lower end portion of said tank upwardly to said air dome and through the upper end wall of said tank, said guide sleeve having a plurality of perforations along the length thereof communicating with the interior of said tank, means for circulating fluid at selected elevated temperature and pressure through said chamber and into said receiving tank, said means for circulating fluid includes means for recycling said fluid throughout said system, and said fluid level in said receiving tank being higher than any other fluid level in said apparatus.

5. An apparatus for vulcanizing hose as set forth in claim 4 wherein said receiving tank is enclosed in an inert gas atmosphere.

6. An apparatus for vulcanizing hose as set forth in claim 4 wherein said receiving tank has a pair of side walls and a pair of end walls, one of said end walls being greater in dimension than said other ones of said end walls, said receiving tank having a top wall with a first planar portion and a second planar portion interconnected by a bridging portion, said second planar portion being of substantially greater surface area than said first planar portion, and said air dome defined by said bridging portion, said second planar portion and a portion of said one end wall and the adjacent portions of said side walls.

7. An apparatus for vulcanizing hose as set forth in claim 6 wherein said air dome is less than 10% of said volume of said receiving tank.

* * * * *